May 6, 1958 S. SQUILLER 2,833,164
ROTARY INDEXING TABLE
Filed Sept. 27, 1955 2 Sheets-Sheet 1

INVENTOR.
Samuel Squiller
BY
Webb, Mackey & Burden
HIS ATTORNEYS

May 6, 1958  S. SQUILLER  2,833,164
ROTARY INDEXING TABLE
Filed Sept. 27, 1955  2 Sheets-Sheet 2

INVENTOR.
Samuel Squiller
BY Webb, Mackey & Burden
HIS ATTORNEYS

United States Patent Office 2,833,164
Patented May 6, 1958

2,833,164

ROTARY INDEXING TABLE

Samuel Squiller, Mount Lebanon Township, Allegheny County, Pa.

Application September 27, 1955, Serial No. 536,942

11 Claims. (Cl. 74—821)

This application relates to a rotary indexing table which is power operated so as to move a fractional part of a revolution at a time, more specifically, an exact submultiple of a revolution in successive steps.

In the usual form, a rotary indexing table is circular in construction and is arranged with a series of machine stations about a portion of the periphery thereof. There are usually one or two loading stations about the remainder of the periphery plus an ejector station adjacent the posterior to the loading stations and in the interval forwardly from the loading stations to the ejector station there are provided various pieces of processing machinery for operating on parts or workpieces carried by the table. Such workpieces may be castings or second operation parts and are supported on the principal outside surface of the table by means of power operated chucks or other suitable fixtures made fast to the table. During each successive fractional part of a revolution, the individual workpieces are advanced from one station to another, examples of such stations being a drilling station occupied by drilling machinery, a milling station occupied by a milling machine, and a chamfering station having a chamfering tool provided to operate on the workpieces.

It is essential during each fractional part of a revolution of the table that each workpiece thereon move rapidly from a stationary position opposite one station and then be positively brought to a halt at an accurately predetermined indexing point opposite the next station. In the past, indexing machines have employed pneumatic dashpots or semi-elastic stops with which to cushion and stop the table thereof at the end of each fractional part of a revolution, but the compressible medium therein has the difficulty that it causes the table to bounce back from the point of indexed stop and tend to oscillate. Various other impositive stop devices have been tried in the past, along with the foregoing, but they have all generally met with the bouncing difficulty or else the difficulty of permitting overtravel of the table at the next stop, more commonly called over-indexing.

The present improved rotary indexing table overcomes the foregoing disadvantages and difficulties by means of having a hydraulically controlled cushioning device to bring the moving table to a positive inelastic stop. Generally, the system of parts constituting the operating mechanism for this table is arranged to eliminate any bounce or elasticity from the system. Further, the power actuation means, which in the present case is pneumatic, is employed so as to act at a point of maximum leverage and torque on the table to set it in motion with the maximum utility of effort and the controlled hydraulic cushion for stopping the table is conneteced so as to provide maximum leverage for efficiency stopping the table without shock or bounce. Further, the present improved table has a power actuated latch for positively latching the same at each station against rotary movement in two directions so as to positively prevent over-indexing or any reversal of motion which might result in under-indexing. Finally, though not necessary in all cases, a one-way pawl or ratchet is provided as an added measure for preventing reversal of motion of the table.

Further features, objects and advantages will be specifically pointed out or become apparent when for a better understanding of the invention reference is made to the following description taken in conjunction with the accompanying drawings, in which in general:

Figure 1:
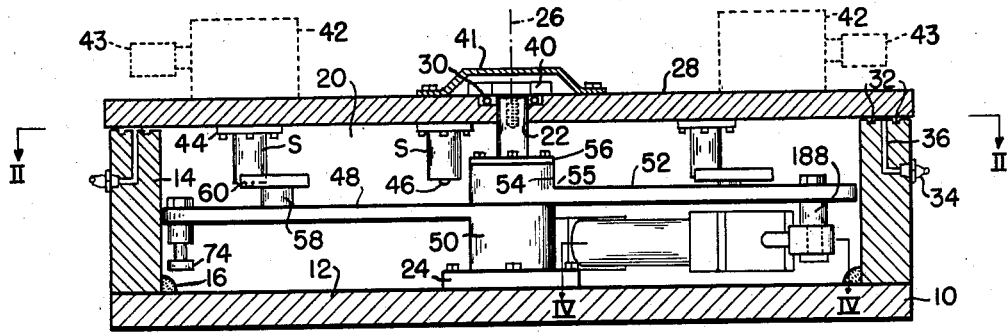
Figure 1 is a sectional view in side elevation of the present rotary indexing table.

In particular, Figures 1–4 show an indexing table structure 10 having a thick generally square metal base 12, which is horizontally disposed and carries a short upstanding thick wall cylinder casting either attached thereto with screws or it may be one piece casting, base and wall.

Each of the four corners of the square base 12 is rounded at the outside edge and has a hold down bolt opening 18 spaced inwardly from the edge for use in firmly securing the base to a suitable supporting surface, not shown. The table structure 10 is hollow so as to provide a machinery compartment 20 and has an upstanding post 22 in the center thereof which is provided with a circular attaching flange 24, suitably bolted to the base 12, or it may be cast with the base 12.

The upstanding post 22 has a vertically disposed central axis 26 and receives at its upper end the hub of a flat, thick table or head 28 of metal which is horizontally disposed to form the upper side of the machine compartment 20 and closes off the same. The hub of the table 28 has a counterbore receiving a thrust bearing 30 and at its periphery the table 28 rests upon the flat upper edge of the short cylinder 14. The upper edge of the cylinder 14 which confronts and supports the underside of the table 28 has a pair of spaced-apart annular grease grooves 32 into which grease is forced through a set of four grease nipple fittings 34 each having an inwardly and upwardly directed passage 36 which communicates with the grooves 32 through a shallow radially extending passage 38 intersecting the latter. This method of lubrication is used when the indexing table is operating in vertical position. For operation in horizontal position, oil saturated wicks spring preloaded with oil cups are used for lubricating the bearing surfaces of the cylinder 14 and the table 28.

A hexagonal adjustable hold down bolt 40 is threaded into a tapped bore formed in the upper end of the post 22 and engages the thrust bearing 30 under predetermined preload so as to clamp the table 28 firmly against the top of the cylinder 14 in a manner whereby the lubricated edge of the latter and the bearing 30 cooperate to permit rotary movement of the table 28.

A hub cover 41 is detachably mounted to the top of the table 28 above the hexagonal hold down bolt 40 on the outer surface of the table 28. The table carries a series of chucks or other suitable fixtures 42 which are arranged in a circular path in equally spaced relationship to one another. This indexing table may be built with any desired number of stations. Illustrated in Figure 2, is a six station table, on which there are provided six chucks or fixtures 42 that carry individual work pieces 43 each of which is radially outwardly directed so as to be accessible to machinery, not shown, which is disposed about the periphery of the table 28 and which operates upon or otherwise machines or forms the workpieces 43.

On its underside, the table 28 carries a plurality of equally spaced depending studs S corresponding in number to the six chucks 42 and having attaching flanges 44 bolted directly to the table 28 to form a circular path. Each of the studs S has a downwardly protruding center boss 46 employed in a manner hereinafter more fully set forth.

A first swinging arm 48 in the compartment 20 has a hub 50 at the inner end thereof which receives the stationary post 22 and is swingingly mounted thereto by means of an anti-friction radial bearing, not shown. The swinging arm 48 is the driving arm for the table 28, and drives the latter through engagement with the ring of studs S. A second swinging arm 52 forms a drag arm in the compartment 20 and has a hub 54 welded at 55 to the inner end thereof which contains a set of radial bearings, not shown, received on the post 22 at a level above the driving arm hub 50. The swinging arm 48 and hub 50 and also the swinging arm 52 and hub 54 may each be one piece castings. The upper and lower hubs 54, 50 have a bolted-down retainer 56 which clamps them against the attaching flange 24 in a manner whereby they may turn on their bearings independently of one another about the post 22 but are firmly held against axial movement.

Figure 2:
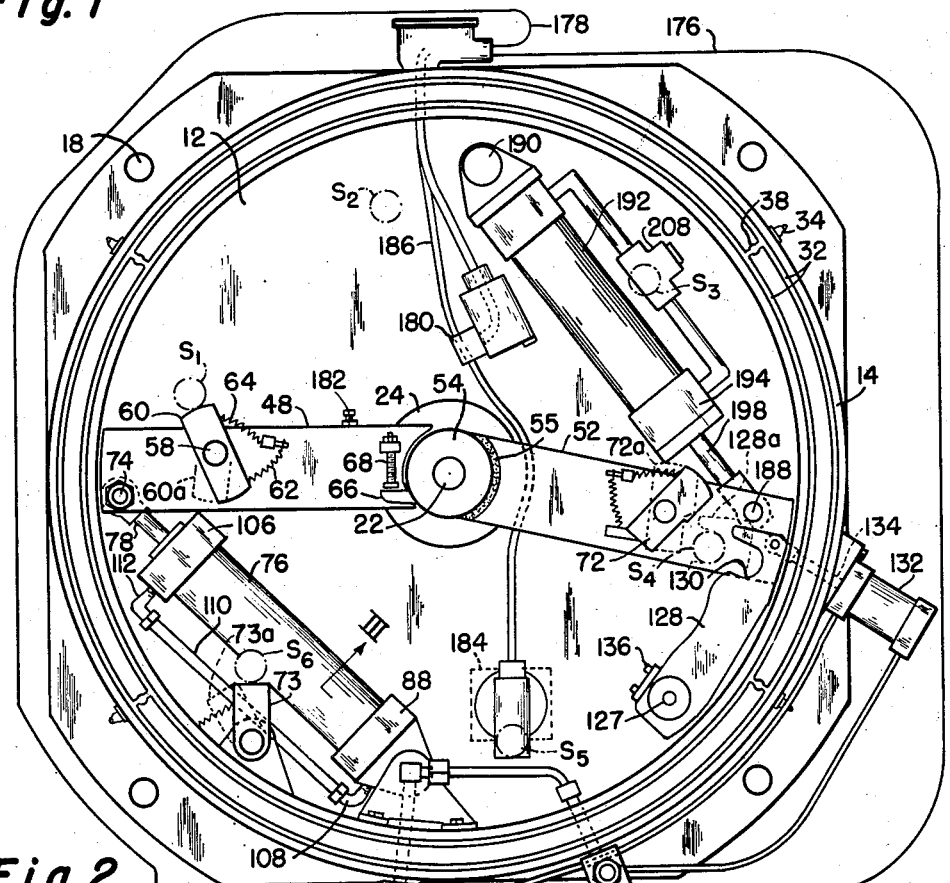
Figure 2 is a partially diagrammatic plan view taken along the sectional lines II—II of Figure 1.
Figure 3:
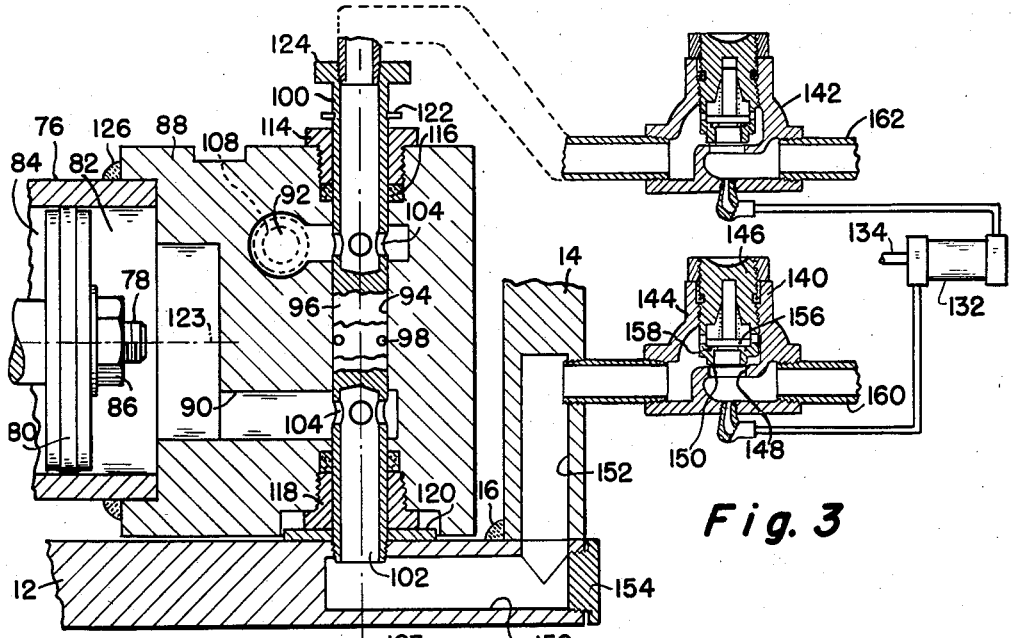
Figure 3 is a sectional view taken along the lines III—III of Figure 2.
Figure 4:
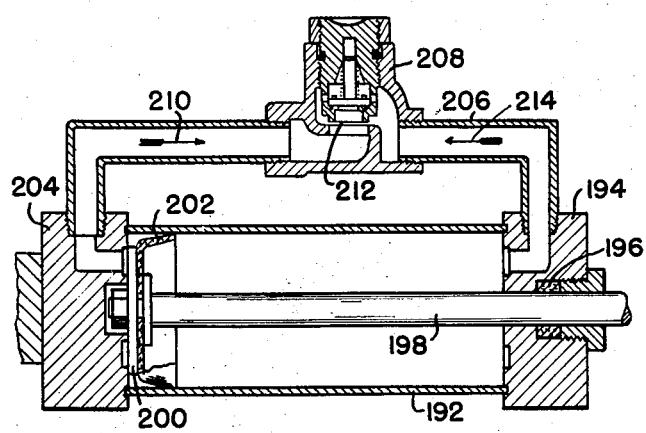
Figure 4 is a sectional view taken along the lines IV—IV of Figure 1 and corresponds generally to a portion of the showing of Figure 2.

At its midportion between the inner and outer ends, the driving arm 48 carries a stationary pivot 58 on which a pawl 60 is pivotally mounted to oscillate between the solid line position shown in Figure 2 and a dotted line position 60a. A first coil return spring 62 acts in tension between a stop on the arm 48 and one end of the pawl 60 to urge the same into the solid line position of Figure 2 and a second coil return spring 64 acts in compression between the stop and the opposite end of the pawl 60 and serves the same purpose as double assurance against spring breakage. In the event of failure of either spring, the other spring remains effective to continue the return movement of the pawl 60. In the solid line position of Figure 2, the pawl 60 engages with one of the ring of depending studs carried by the table 28, which for convenience are identified by the specific reference numerals $S_1$, $S_2$, $S_3$, $S_4$, $S_5$, and $S_6$ in Figure 2.

Clockwise motion of advance of the driving arm 48 causes the pawl 60 and the stud engaged therewith, for instance the stud $S_1$, to move the table 28 clockwise in unison therewith. Retractive movement of the arm 48 in a counterclockwise direction causes the pawl 60 to separate from the stud $S_1$ and wipe against the side of the next successive stud $S_6$ which deflects the side of the pawl to oscillate the same into the dotted line position 60a in which it will initially clear the stud $S_6$ and then drop behind the same under return spring pressure to engage the latter for another successive driving movement.

The drag arm 52 carries a similar pawl 72 which is engageable by the ring of studs carried on the underside of the moving table to cause the drag arm 52 to move conjointly therewith toward the latter part of each successive turn of the table. Clockwise motion of the pawl 72 into the inactive position shown by the dotted lines 72a in Figure 2 is accomplished by a means more fully hereinafter set forth and results in the pawl 72 being clear of and out of the path of travel of the ring of studs, for instance, the stud $S_4$ with the result that the arm 52 is retracted independently of the table 28.

The arms 48 and 52 are interconnected for conjoint movement in a counterclockwise direction by means of a lost motion connection which includes a lug 66 joined to the hub 54 of the drag arm and engaged by means of a threadably adjusted stop 68 which is locked to the arm 48 as by means of a lock nut or other suitable retainer carried by the stop.

A nonback-up pawl 73 (designated 73a in its withdrawn position) is carried by the stationary base 12 and is spring urged into a position in which it prevents reverse movement of the ring of studs, for instance, the stud $S_6$, and the table 28 during retractive movement of the arm 48.

The arm 48 carries a rigid depending pivot 74 at its outer end which describes an arcuate path of motion closely spaced with respect to the cylinder 14. A pneumatic driving cylinder 76 for driving the arm 48 has a piston rod 78 provided with an eye which is connected to and receives the pivot 74. The piston rod 78, Figure 3, passes inwardly from its eye into the cylinder 76 and carries a piston 80 at the inner end which divides the cylinder 76 into an inner working chamber 82 and an outer working chamber 84 which when selectively pressurized force the piston and piston rod 78 to slide inside the cylinder 76. A retainer nut 86 screwed onto the rod 78 holds the rod 78 and piston 80 together. The cylinder 76 has a cast closure member 88 at the inner end thereof which is provided with a vertically directed eye 94 and a pair of upper and lower passages 90 and 92 which are transverse to and intersect the eye 94. The eye 94 receives a smooth surfaced upstanding stud 96 having a groove about the girth of the midportion thereof which receives O-ring seal 98 which seals apart the two passages 90 and 92. The stud 96 has a pair of hollow tubular opposite end portions 100 and 102 which extend in opposite vertical directions from the midportion thereof along a central axis 103. Adjacent the juncture between the solid midportion and each of the ends, the stud 96 has a series of side openings 104 which communicate with the interiors of the upper and lower portions 100 and 102 and which register with the respective passages 90 and 92 in the closure member 88.

At the end opposite to the inner closure member 88, the cylinder 76 has an outer closure member 106 which slidingly receives the piston rod 78, being sealed fluid tight to the latter and communicating directly with the outer working chamber 84 within the cylinder 76. The upper passage 92, Figure 3, in the closure member 88 is connected by means of the outer closure member 106 to the outer working chamber 84 through a fitting 108, a rigid pipe 110, and another fitting 112. At the upper end of the eye 94, the closure member 88 receives a threaded, bronze bushing bearing 114 which turns on the stationary stud 96 as a center, and which clamps a deformable seal 116 in fluid tight engagement against the stud 96. The lower end of the eye 94 threadably receives a similarly sealed bushing bearing 118 which rests upon a thrust washer 120 carried by the base 12. The lower end portion 102 of the stud 96 is threaded into a tapped opening in the base 12. A snap ring retainer 122 occupies a groove on the stud portion 100 and at its upper extremity the stud portion has a hexagonal-shaped enlarged portion 124 for receiving a tool to tighten the threaded lower portion 102 of the stud 96 into the base 12. The resulting cylinder assembly including the cylinder 76 and the end closure members 106, 88, which are bolted or welded fluid tight thereto at 126, is swingably mounted for oscillatory movement in a horizontal plane about the stud axis 123 as a center.

The base 12 carries a rigid upstanding pivot 127, Figure 2, which pivotally mounts the lower end of an oscillatable latch 128 having a semi-circular notch 130 in the inner side of the upper swinging end thereof. A pneumatically operated power cylinder 132 is connected to drive the pivoted latch 128 into a pair of opposite positions by means of a piston rod 134 which is pivotally connected to the upper swinging end of the latch. The power cylinder 132 forces the latch 128 to swing from the solid line unlatched position of Figure 2 into the dotted line latching position shown by the dotted lines 128a in which the lug forming outer end of the latch 128 engages the pawl 72 to move the latter into its inactive poistion shown by the dotted lines 72a. Additionally, the notch 130 receives and retains the adjacent stud $S_4$ simultaneously being released by the pawl 72. A stop 136 is bolted to the base 12 adjacent the pivot 127 and is engaged by the drag arm 52 in the extreme clockwise position of the latter into which it is driven by the studs on the table 28, for instance by means of the stud $S_4$ in the position of Figure 2. Operation of the motor 132 to drive the latch 128 to the dotted line position 128a of Figure 2 has a two fold effect in that the opposite shoulders on the latch defining the notch 130 hold the stud $S_4$ and the table 28 against movement in both rotational directions. The latch 128 also causes the pawl 72 to disengage from the stud $S_4$ and occupy an inactive position in which the arm 52 may appropriately retract in a counterclockwise direction beneath the stud $S_4$.

The power cylinders 76 and 132 have a common control valve 138 which is connected thereto through a pair of flow-check valves 140 and 142. The flow-check valve 140 has a pair of split branches which are connected to the inner working chamber 82 of the cylinder 76 and to the front of the latch control cylinder 132 so as to cause the same to retract at the time at which the cylinder 76 extends itself. The flow-check valve 142 has a pair of split branches which are connected to the outer working chamber 82 of the cylinder 76 and to the rear of the cylinder 132 for extending the latter and advancing the latch 128 at the time at which the cylinder 76 is retracted.

The flow-check valves 140, 142 are identical with one another and in the interests of brevity only the flow-check valve 140 is particularly described hereafter. The flow-check valve 140 includes a valve body 144 in which a center member 146 is threadably, adjustably received. The lower end of the center member 146 adjustably covers and restricts an opening 148 formed in the valve body and defining an adjustable annular gap 150 therewith. The inner working chamber 82 in the cylinder 76 is connected through the hollow interior of the lower stud portion 102 by means of a pair of passages 152 which are drilled to intersect with one another and which are arranged in the base 12 with a plug 154 provided at their point of intersection. The passages 152 are connected to the posterior end of the flow-check valve 140, and also the branch line from the power cylinder 132 is similarly connected to the valve 140. When a stream of exhausting air flows from the working chamber 82 through the flow-check valve 140, it passes through the adjustably restricted gap 150 in the valve 140 which thereby controls the speed and rate at which the cylinder 76 operates. Another stream of exhausting air is simultaneously flowing from cylinder 132 and enters in opposite end of valve 140 which is not restricted. The center member 146 in the flow-check valve 140 is hollow and carries a poppet type, spring loaded check-valve element 156 which seats upon an O-ring seal 158 carried in the inner part of the center member 146. When fluid passes in the direction from the common control valve 138 into the working chamber 82 of the cylinder 76 and into the front of the cylinder 132, it causes the check-valve element 156 to unseat upwardly and by-pass the adjustable gap 150 so as to provide free flow in entering the respective cylinders. The companion flow-check valve 142 operates similarly to provide for the free unchecked flow of fluid into the cylinders 76 and 132 and for the restriction-controlled escape of fluid exhausted therefrom.

The control valve 138 is a three-spool type solenoid valve which is connected at one end through a conduit 160 to the flow-check valve 140 and is connected at the opposite end to the companion flow-check valve 142 through a conduit 162. The valve 138 has a pair of opposite operating positions, 138a and 138b which it assumes from the solid line transition position shown in Figure 2. In the operating position shown by the dotted lines 138a shown to the left in Figure 2, the valve 138 has a spool which closes off a right-hand vent V, and also the valve 138 connects the conduit 162 directly to a pneumatic pressure source 164, simultaneously venting the conduit 160 through a left-hand vent V. In the opposite position shown by the dotted lines 138b to the right, the valve 138 connects the conduit 160 and the pneumatic source 164, and vents the conduit 162 through the right-hand vent V. The three spool element in the valve 138 may have a ball detent device, not shown, to hold the same positively in each of its two opposite operating positions, and carries an armature 166 at each of its opposite ends. A solenoid coil 168 is provided for electromagnetically controlling each of the armatures 166 so as to selectively shift the valve 138 into each of its operating positions, depending upon which coil 168 is energized.

Magnetization of the coils 168 is accomplished through a source of electric power 170 which may be energized at 110 volts A. C. and is connected thereto through a suitable double pole switch 172. A manually controlled push button switch 174 between the switch 172 and one of the coils 168 operates the latter whereas the other coil 168 is included in circuit with a pair of conductors 176 and 178 which are connected through the operation of a reversing microswitch 180. The microswitch 180 is engageable by an actuating finger 182 adjustably carried by the driving arm 48 and effective to close the microswitch 180 in the extreme clockwise driving direction of the arm 48 so as to reverse the latter. Thus, closure of the microswitch 180 causes the valve 138 to be electromagnetically shifted into the operating position 138b. Thereupon, the cylinder 76 is caused to withdraw itself and retract the arm 48 simultaneously with the extension of the cylinder 132 which forces the latch 128 into latched position. The driving arm 48 is caused to retract counterclockwise and, toward the end of its retractive travel, for instance three quarters of the way through the retractive travel, the lost motion connection 66 engages and establishes a connection between the arms 48 and 52 with the result that they move in unison together through the last quarter of the retractive travel of the arm 48.

A dead center switch 184 may be provided within the machinery compartment 20 in a position exactly to underlie a stud, for instance the stud $S_5$ so as to be in the path of and be engaged by the protrusions 46 carried by the studs. The dead center switch 184 has a connection 186 leading through a sealed opening in the side of the cylinder 14 and transmitting a signal to appropriate machinery, not shown, disposed about the table 28 for preparing the machines for automatic operation at a time only when the table 28 is properly indexed and at rest. The non-backup pawl 73 prevents any retrograde travel of the table which might be a tendency during reversal and initial movement of the arm 48 or 52 or both as they retract. The latch 128 positively holds the table 28 in a latched properly indexed position in which the dead center switch 184 is actuated. Closure of the manually controlled switch 174 causes the control valve 138 to be electromagnetically shifted into the dotted line position shown by the dotted lines 138a for driving the table 28 forwardly, but without attendant motion on a part of the drag arm 52 except during the last quarter of each stroke of travel of the driving arm 48 and the table 28.

The drag arm 52 describes an arcuate path of swing closely spaced to the cylinder 14 and at its swinging outer end it carries a rigid depending pivot 188. The base 12 carries a fixed up-standing pivot 190 which swingably mounts the fixed end of a hydraulic damper cylinder 192 adapted to be charged with incompressible liquid such as oil. The cylinder 192 has an end closure member 194 at the free end thereof carrying a seal 196 through which a piston rod 198 slides. At the outer end the piston rod 198 has the eye thereof connected to the pivot 188 and at the inner end the piston rod 198 is threaded and carries a nut and a pair of plunger clamping washers 200. The plunger clamping washers 200 clamp a leather plunger or piston cup 202 therebetween which reciprocally slides in the cylinder 192. The end closure member 194 is connected to an opposite end closure member 204 for the cylinder 192 through a liquid by-pass conduit 206 which includes a flow-check valve 208 for the liquid therein. The flow-check valve 208 used with the hydraulic cylinder 192 is similar to the flow-check valve 140 for the pneumatic system previously described and it is operated in the same fashion except for the fact that the system necessarily included with the hydraulic damper cylinder 192 is charged with hydraulic liquid and not with air or other compressed gas. The flow-check valve 208 unseats upwardly to permit free flow of the hydraulic fluid therethrough in the direction of the arrow 210, Figure 4. However, the valve 208 has a restrictive gap 212 which causes restriction to flow in the direction of the arrow 214. Movement of the piston rod 198 to the right, as viewed by Figures 2 and 4, causes hydraulic fluid trapped between the piston 202 and the end closure member 194 to meet with resistance in transferring to the opposite end of the cylinder through the bypass 206 and the restriction 212 and it therefore rises in pressure. In one physically constructed embodiment of the invention when operated this pressure rose to 1,500 p. s. i. or greater. Thus, the drag produced by the drag arm 52 tends to be substantial and the table 28 markedly reduces in speed toward the latter part of each of its strokes of advancing motion. At the end point of advancing motion of the arm at which it engages the reversing microswitch 180, the drag arm 52 is at or close to engagement with the limit stop 136, Figure 2.

A cycle of operation of the rotary indexing table through one fractional part of a revolution is best understood from the sequential Figures 5, 6, 7, 8 and 9.

Figure 5:
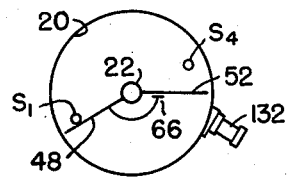
Figures 5, 6, 7, 8, and 9 are diagrammatic sequential views showing the steps of operation of the present table.
Figure 6:
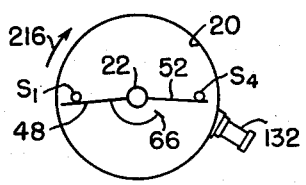

Figure 5 shows the arms 48 and 52 in the fully retracted position which they occupy with respect to the post 22 prior to an advancing stroke within the machinery compartment 20. From the position of Figure 5, the driving arm 48 advances in the direction of the arrow 216, Figure 6, so as to cause the studs $S_1$ and $S_4$ and the table to advance clockwise into a position whereby the latter stud engages the drag arm 52. In the position of Figure 6 the lost motion connection 66 occupies its fully extended position. Further motion of the driving arm 48 in the direction of the arrow 216, Figure 6, is accompanied by conjoint motion of the drag arm 52 due to the connection formed between the arms by means of the studs $S_1$ and $S_4$ which are rigid with the rotary table.

Figures 7, 8, 9:
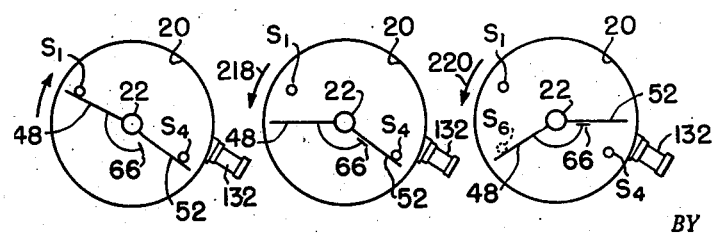

Figure 7 shows the arms 48 and 52 in their extreme counterclockwise position about the post 22, at which the lost motion connection 66 is fully extended, and at which the driving arm 48 contacts the reversing switch 180, Figure 2. The latching motor 132, Figure 7, causes the latch to engage the stud $S_4$ at the time at which the driving arm 48 reverses its direction of rotation.

Figure 8 shows the driving arm 48 after it has completed approximately three quarters of its reverse motion in the direction of the arrow 218. At this point the lost motion connection 66 is fully closed and the drag arm 52 begins to move conjointly with the arm 48 and beneath the stud $S_4$ which is latched by the latching motor 132. The relation of the stud $S_4$ to the drag arm 52 immediately after it is cleared by the latter is shown in Figure 2, at which instant the latch occupies the dotted line position 128a.

Figure 9 shows the arm 48 after being fully retracted in the direction of the arrow 220. At this time the lost motion connection 66 has forced the drag arm 52 into a position corresponding to its initial position of Figure 5. The driving arm 48 likewise assumes a position corresponding to that in Figure 5 in which the driving arm 48 gets behind the next successive stud $S_6$ in preparation for another driving stroke.

As herein disclosed the invention is shown embodied in a horizontally disposed index table 28 which is lubricated with felt wicks which are inserted in the hole 36 and saturated with oil through suitable oil cups which replace the grease fittings 34. It is evident that the rotary table and associated structure can be used to equal advantage in vertical position by lubricating by grease at its outer periphery. The fact will be appreciated that the flow-check valve 208 is utilized to provide a controlled hydraulic cushion which drags on the drag arm 52 in one direction only of the piston rod 198 and that retractive movement of the piston rod 198 is accomplished against little or no hydraulic resistance owing to the fact that the leather cup 202 tends to collapse and also the valve 208 unseats. The further fact will be appreciated that the pneumatic operation of the power cylinders 76 and 132 is accomplished by free flow pressurization and that control of the speed of movement of their piston rods is effected through controlled escape and venting of the exhausted air from the cylinders under control of the adjustable flow-check valves 140 and 142. It is apparent that through use of the hollow ended pivot stud 96 for the eye of the power cylinder 76 a double purpose is accomplished in that the stud forms the pivot for the cylinder and at the same time supplies the opposite ends of the cylinder with air through rigid connections. This novel dual purpose provides the functions ordinarily accomplished by means of a solid pivot and a conventional flexible hose with or without fluid tight slip couplings or swivel joints which are difficult to maintain and difficult to prevent from leaking.

Variations within the spirit and scope of the invention described are equally comprehended by the foregoing description.

What is claimed is:

1. In mechanism for controlling the position of a rotary indexing table head which rotates a fraction of a revolution at a time, a plurality of arms each capable of limited independent movement in said mechanism comprising one arm having means drivingly connected thereto which is fluid actuated in one direction to operate through a stroke for rotatably moving said head through a predetermined angle, another of said arms operatively arranged to be dragged along parasitically by the table head and being drivingly connected to hydraulic cushion means for resisting said motion through a portion of said angle, said one arm being fluid actuated in the opposite direction to reset itself for the next operating stroke and having means of adjustment operating therewith at a preselected point to limit further movement between the arms and causing the one arm to conjointly reset said other arm therewith for its next motion resisting stroke.

2. In mechanism for controlling the position of a rotary indexing table head which rotates an exact submultiple of a revolution at a time, a plurality of arms included in said mechanism comprising one arm having means drivingly connected thereto which is fluid actuated in one direction to operate through a stroke for rotatably moving said head from a first position through a predetermined angle to a second position, another of said arms operatively arranged to be dragged along parasitically by the table head and being drivingly connected to hydraulic cushion means for resisting said motion throughout the last portion of said angle, and means for latching said head in said second position, said one arm being fluid actuated in the opposite direction to reset itself for the next operating stroke and having a lost motion connection to said other arm for conjointly resetting the same for the next motion resisting stroke.

3. Mechanism for controlling the position of a rotary indexing table head which rotates a fraction of a revolution at a time, said mechanism comprising a double acting pressure fluid power cylinder for rotatably moving said head from a first position through a predetermined angle to a second position after which the cylinder acts reversely, hydraulic cushioning means for resisting said motion throughout the last portion of said angle, a latch operable to latch said head in said second position and having a pressure fluid power cylinder for operating the same, and means including a control element common to said cylinders and sensing the point at which the head reaches its second position aforesaid, said control element being connected to the cylinders and effective at that point for causing them to commence to operate simultaneously.

4. In an indexing table device having a rotary table forming one side of a compartment therein, mechanism in said compartment for controlling the rotation of the table comprising arms connected at one end to swing independently of one another about a common inner point, said arms having a mid-portion between the respective ends thereof and having the outer end swingable in an arc closely spaced with respect to the outer periphery of the compartment, and one way drive means effective between the mid-portion of each arm and the table to cause the table to travel conjointly with one arm as it drivingly swings in one direction and to cause another arm which is damper-connected to be physically dragged by the table in conjoint movement during a portion of said travel of the latter, for slowing it.

5. In an indexing table device having a rotary table forming one side of a fixed compartment therein, mechanism for controlling the rotation of the table comprising arms connected at one end to swing independently of one another about a common inner point, said swinging arms having a table-engaging mid-portion between the respective ends thereof and having the outer end swingable through differing lengths of arcs adjacent the outer periphery of the compartment, a lost motion connection between the arms causing the one with the long arc of swing when it oscillates to reset itself to reset another arm through the required shorter arc thereof, and one way pawl means effective between the fixed compartment and the rotary table to hold the latter against rotary travel with the arms, in one direction.

6. In an indexing table device having a rotary table forming one side of a compartment therein, mechanism for controlling the rotation of the table comprising arms connected at one end to swing about a common inner point within said compartment, said arms having a portion between the respective ends thereof adapted to be operatively connected to the table and having the outer end swingable in an arc adjacent the outer periphery of the compartment, at least one of said arms being a table-driving arm for driving the latter through a part-revolution of travel, and one way damper means effective between the outer end of another of said arms and a fixed point in said compartment to create a controlled hydraulically cushioned drag on said other arm and said table during the last portion of travel of the latter.

7. In an indexing table device having a rotary table forming one side of a machinery compartment therein, machinery for controlling the rotation of the table comprising driving and drag arms connected at one end to oscillate about a common inner point in the machinery compartment, said arms having means effective between the respective ends thereof to provide an operative connection to the table and having the outer end swingable in an arc adjacent the outer periphery of the compartment, and one way driving means forming a lost motion connection between said driving arm and said drag arm and effective when the former oscillates past a predetermined point in traveling in one direction to cause the latter to move conjointly therewith throughout the remainder of the travel.

8. An indexing device having a rotary table forming one side of a compartment for power mechanism, said compartment being substantially coextensive laterally with said table, and mechanism in said compartment comprising swinging arm structure engageable with means connected to said table for controlling the position thereof, and including individual members having their terminals arranged to swing in paths at the periphery of said compartment, pressure fluid cylinders having their respective piston rods connected to the terminals of different ones of said members at points in closely spaced adjacency to the periphery of the chamber, means including restrictive valving for controlling the application of a pressure fluid differential in one of said cylinders to oscillate the associated member and set the table in motion under fluid power, and means including restrictive valving for controlling the flow of pressure fluid in another of said cylinders to produce a hydraulic drag on the associated member for bringing the table to rest.

9. An indexing device having a rotary table forming one side of a compartment for power mechanism, and mechanism in said compartment comprising swinging arm structure engageable with means connected to said table for controlling the position thereof, and including individual members having their terminals arranged to swing in paths at the periphery of said compartment, pressure fluid devices having their respective power operating elements connected to the terminals of the different ones of said members at points in closely spaced adjacency to the periphery of the chamber, means including a flow-check valve for controlling the application of a pressure fluid differential in one of said devices to oscillate the associated member and set the table in motion under fluid power, and means including a flow-check valve for controlling the flow of pressure fluid in another of said devices to produce a hydraulic drag on the associated member for bringing the table to rest.

10. An indexing device having a rotary table forming one side of a compartment for power mechanism therein, said compartment being substantially coextensive with said table in a lateral direction, and mechanism in said compartment comprising swinging arm structure engageable with means connected to said table for controlling the position thereof, and including individual members having their terminals arranged to swing in paths at the periphery of said compartment, pressure fluid cylinders having their respective piston rods connected to the terminals of the different ones of said members at points in closely spaced adjacency to the periphery of the chamber, at least one of said cylinders being a double acting power cylinder, means including a valve for controlling the application of a pressure fluid differential in said power cylinder to cause conjoint driving movement of the associated member and said table in one direction and reverse movement of the cylinder and member, means including a latch and another double acting power cylinder under control of said valve for operating said latch in one direction and being reversible to operate said latch into a position for holding the table against rotation, and actuating means connected to said valve including a device in the path of one of said members effective to reverse said double acting cylinders simultaneously to hold the table and reversely move the driving member without it.

11. Mechanism comprising a plurality of arms for controlling a rotary indexing table head, said head adapted to move through an exact submultiple of a revolution at a time, drive connections operative between the table head and each of said arms to coordinate movement of the same during at least part of each submultiple of a revolution, each arm being mounted for independent movement relative to another arm and a direct connection between said arms having means of adjustment to prevent further relative movement therebetween beyond a selected point so as to enable the movement of one arm to carry the other.

References Cited in the file of this patent

UNITED STATES PATENTS

| | | |
|---|---|---|
| 692,071 | Pugh | Jan. 28, 1902 |
| 827,252 | Mendenhall | July 31, 1906 |
| 1,578,232 | Ferris | Mar. 23, 1926 |
| 1,942,927 | Johnson et al. | Jan. 9, 1934 |
| 2,293,167 | Overbeke | Aug. 18, 1942 |
| 2,382,457 | Wertman et al. | Aug. 14, 1945 |
| 2,400,691 | Grad | May 21, 1946 |
| 2,600,960 | Benjamin et al. | June 17, 1952 |
| 2,622,487 | Schultz | Dec. 23, 1952 |
| 2,645,981 | Hirvonen | July 21, 1953 |